United States Patent
Feinschreiber et al.

(10) Patent No.: US 8,930,217 B2
(45) Date of Patent: Jan. 6, 2015

(54) METHOD AND SYSTEM FOR OPTIMIZING SAVINGS BENEFITS

(71) Applicant: FMR LLC, Boston, MA (US)

(72) Inventors: Steven Andrew Feinschreiber, Attleboro, MA (US); Stephen J. Devaney, Cohasset, MA (US); Christi Rager Wise, Wilmette, IL (US); Don Chun, Bedford, NH (US); Adheesh Sharma, Newton, MA (US); Charles Christopher Herman, Cohasset, MA (US)

(73) Assignee: FMR LLC, Boston, MA (US)

( * ) Notice: Subject to any disclaimer, the term of this patent is extended or adjusted under 35 U.S.C. 154(b) by 41 days.

(21) Appl. No.: 14/017,959

(22) Filed: Sep. 4, 2013

(65) Prior Publication Data

US 2014/0006050 A1    Jan. 2, 2014

Related U.S. Application Data

(63) Continuation-in-part of application No. 13/454,659, filed on Apr. 24, 2012.

(60) Provisional application No. 61/872,360, filed on Aug. 30, 2013.

(51) Int. Cl.
*G06Q 40/00*     (2012.01)
*G06Q 40/06*     (2012.01)

(52) U.S. Cl.
CPC ............... *G06Q 40/06* (2013.01); *G06Q 40/00* (2013.01)
USPC .......................................................... 705/2

(58) Field of Classification Search
USPC ............................................................. 705/4
See application file for complete search history.

(56) References Cited

U.S. PATENT DOCUMENTS

| | | | |
|---|---|---|---|
| 5,875,437 | A | 2/1999 | Atkins |
| 6,684,190 | B1 | 1/2004 | Powers et al. |
| 7,571,125 | B2 | 8/2009 | Coyle |
| 7,627,512 | B2 | 12/2009 | Harris et al. |
| 7,634,436 | B1 * | 12/2009 | Wagner .......................... 705/35 |
| 7,647,261 | B2 | 1/2010 | Merton et al. |
| 7,689,494 | B2 | 3/2010 | Torre et al. |
| 7,711,619 | B2 | 5/2010 | Merton et al. |
| 7,739,131 | B1 | 6/2010 | Luedtke |
| 7,996,294 | B1 | 8/2011 | Thurmond et al. |
| 8,204,768 | B1 * | 6/2012 | Grinberg ........................... 705/4 |
| 8,335,741 | B2 | 12/2012 | Kornegay et al. |
| 8,484,109 | B1 * | 7/2013 | Nelson Deurmier et al. ... 705/35 |
| 2004/0054610 | A1 | 3/2004 | Amstutz et al. |
| 2005/0246260 | A1 | 11/2005 | Hodgdon et al. |

(Continued)

*Primary Examiner* — John Pauls
(74) *Attorney, Agent, or Firm* — Proskauer Rose LLP

(57) ABSTRACT

A method is provided for optimizing savings in financial accounts, including healthcare and retirement accounts for an employee and or participant. The method includes receiving information about the participant and financial accounts for which the participant is eligible to use and or using, and generating for the participant a savings hierarchy recommending the order and amounts to be contributed to the financial accounts from the participant's budgeted savings dollars. The method also includes determining generating the savings hierarchy for both full year and partial year activity by the participant. The method further includes transmitting the recommendations to the participant via data displayed as a graphical user interface with a graphical representation of the savings hierarchy to provide the participant with ease of understanding the recommendations for optimizing the budgeted savings dollars or selected contribution amount.

21 Claims, 8 Drawing Sheets

(56) References Cited

U.S. PATENT DOCUMENTS

| | | |
|---|---|---|
| 2006/0241989 A1 | 10/2006 | Walters et al. |
| 2007/0055602 A1 | 3/2007 | Mohn |
| 2007/0192224 A1 | 8/2007 | Quayle et al. |
| 2007/0244777 A1 | 10/2007 | Torre et al. |
| 2008/0010086 A1 | 1/2008 | Skelly et al. |
| 2009/0006269 A1 | 1/2009 | Klayman |
| 2009/0192947 A1 | 7/2009 | Kenigsberg et al. |
| 2009/0281959 A1 | 11/2009 | Abidi et al. |
| 2009/0307088 A1 | 12/2009 | Littlejohn |
| 2010/0250430 A1 | 9/2010 | Ariff et al. |
| 2010/0306127 A1 | 12/2010 | Weinberger et al. |
| 2012/0053964 A1 | 3/2012 | Williams et al. |
| 2013/0006824 A1 | 1/2013 | Maisonneuve |
| 2013/0036021 A1 | 2/2013 | Wright |

* cited by examiner

FIG. 1

Confirm The Following Info To Get Started

Your Salary & Tax Info

Annual Salary [ $75,000 ]   Federal Tax Rate [ 25% ▼ ]   State Tax Rate [ 7% ▼ ]
100                          101                          102

Estimate Your 2013 Out-Of-Pocket Medical Expenses
103

[ $3,425 ▼ ] 104

LOW   MEDIUM   HIGH   MAX
105    106     107    108

Or Enter Your Own Amount
109

For example:
"I have a minor condition that requires routine
prescriptions and office visits."
110

[ Ok, Let's Optimize My Savings ▶ ]

FIG. 4
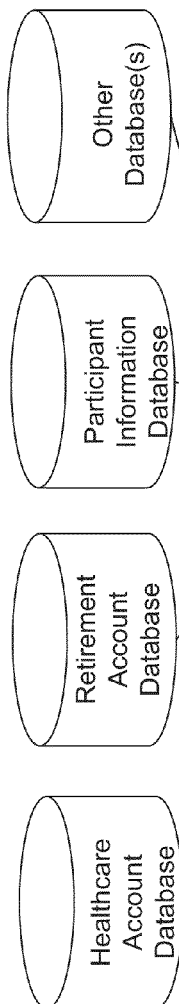
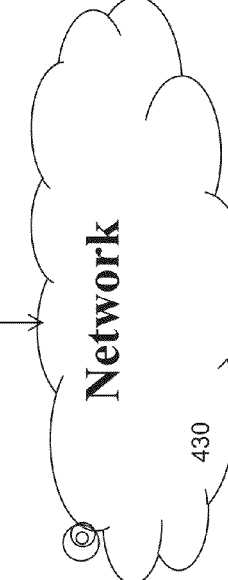
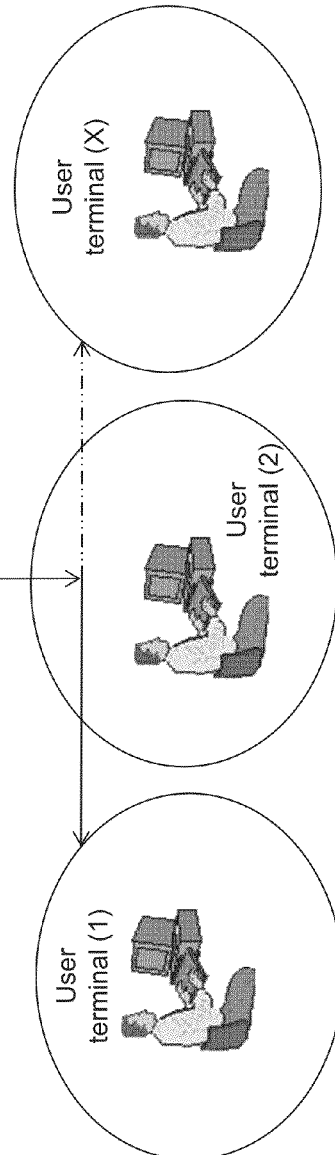

| Accounts | Parameters | As Annual | Prorated | Weighted | Reconciled | Rule-Based |
|---|---|---|---|---|---|---|
| Healthcare Accounts | HSA-eligible expenses | | X | | | |
| | Employer HSA Contributions | | X | | | |
| | Deductibles | X | | | | |
| | Out of Pocket Maximums | X | | | | |
| | HSA Limits | | | X | | |
| | FSA-eligible expenses | | X | | | |
| 401(k) Account | Participant Compensation | | X | | | |
| | Maximum Compensation | | | | | X |
| | Health Rewards | | | | | X |
| | 415 Limit | | | | X | |
| | 402(g) Limit | | | | X | |
| IRA Account | IRA Limit | | | | X | |
| | Household Compensation | | | X | | |
| | 401(k) Contribution | | | | X | |
| | HSA Contributions | | | | X | |
| | IRA Contributions | | | | X | |
| | Plan Premiums | | X | | | |

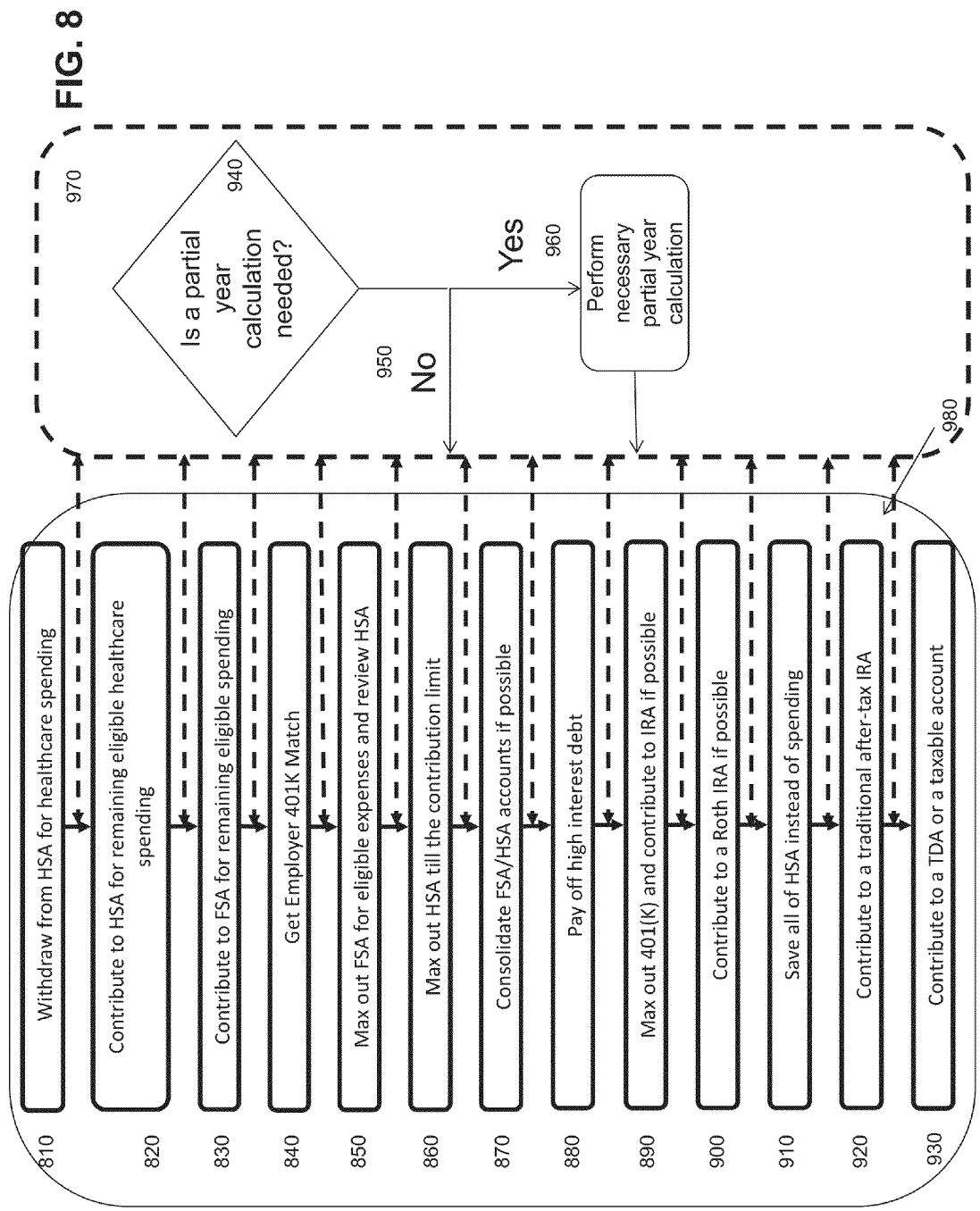

ial patent application Ser. No. 13/454,659, filed Apr. 24, 2012, and claims benefit of and priority to U.S. Provisional Patent Application No. 61/872,360, filed Aug. 30, 2013, the entire disclosures of each of which are hereby incorporated herein by reference.

METHOD AND SYSTEM FOR OPTIMIZING SAVINGS BENEFITS

CROSS REFERENCE TO RELATED APPLICATIONS

This application is a continuation-in-part of U.S. patent application Ser. No. 13/454,659, filed Apr. 24, 2012, and claims benefit of and priority to U.S. Provisional Patent Application No. 61/872,360, filed Aug. 30, 2013, the entire disclosures of each of which are hereby incorporated herein by reference.

FIELD OF THE INVENTION

The invention relates generally to computer-implemented methods and apparatuses, including computer program products, for optimizing benefits, and more particularly, to optimizing savings benefits in various financial accounts including healthcare and retirement accounts.

BACKGROUND OF THE INVENTION

Managing healthcare and retirement costs, already a concern for many people, is likely to become a major focus for people and families in the future. Over the past 10 years or more, the U.S. healthcare system has experienced a rate of inflation about 2.6 times higher than the rate of general economic inflation and this rate of increase is not expected to abate in the coming decade. Some of the factors contributing to rising healthcare expenses for people include, for example, greater cost-sharing between employers and workers with more costs borne by the workers, higher deductibles and co-payments, shift from co-pays to co-insurance, employers dropping coverage, reduced or eliminated retiree health benefits and high unemployment.

A HDHP is a health insurance plan with lower premiums and higher deductibles than a traditional health plan. Individuals covered by a HDHP are generally eligible for a healthcare savings account, such as a health savings account (HSA) and/or a limited purpose flexible spending account (limited purpose FSA). A HSA is a tax-advantaged medical savings account available to taxpayers who are enrolled in a HDHP. The funds contributed to the HSA are not included in earned income, thus reducing income taxes. HSA funds can be invested as well. The earnings are not taxed and neither are the withdrawals if they are used to pay for qualified medical expenses. The funds in the HSA roll over and accumulate year to year if not spent. Thus, an HSA can also be a powerful means to save for healthcare expenses in retirement. A FSA is a tax-advantaged financial account that can be created through an employer. The account allows an employee to set aside a portion of earnings to pay for qualified expenses in the current tax year only. Money deducted from an employee's pay into a FSA is also not subject to payroll taxes. Unlike the HSA, funds not used by the end of the plan year in a FSA are generally lost to the employee. Generally, for employees not enrolled in a HDHP, the employees can use a FSA to pay for qualified medical expenses. For employees enrolled in a HDHP, the employees often has available a a limited purpose FSA to pay for qualified medical expenses, which may be limited to expenses related only to uncovered vision and/or uncovered dental, for example.

In view of rising healthcare costs, one of the greatest concerns for many people is that the increase in family healthcare expenses will reduce their ability to save for retirement, especially when wage growth is limited. For example, people may only be able to pay for today's healthcare by giving up tomorrow's retirement security.

As people increasingly save less for retirement because of rising healthcare costs, finding the right balance between covering health care expenses and saving for retirement will rise in importance. Additionally, as the majority of people begin to use HSAs and FSAs as part of their benefits, people will need help and guidance on how best to optimize their savings, for example with a HSA versus a 401(k), or a HSA and a 401(k). Further, people will need help determining how best to pay for out-of-pocket medical expenses in addition to optimizing their overall benefits spend and make the most of their company's benefits plans.

Additionally, many people miss out on greater savings opportunities by not reevaluating their savings dollars throughout the year. Rather most people attend to their health care and retirement benefits, as well as their other similar financial accounts, on a yearly basis or after a lifetime event. Traditionally people only change their plans, allocations and elections on an annual basis, or for qualified life events. No tool is available to enable participants to efficiently navigate the complexities of optimizing their saving abilities across various financial accounts throughout the year for situational changes.

SUMMARY OF THE INVENTION

Methods and apparatus are provided to implement practical strategies for managing healthcare and or retirement costs. To help counteract the dramatic rise in healthcare costs during both a taxpayer's wealth accumulation and retiree years, the federal government has created tax-favored savings and investing opportunities. Methods and apparatus are provided to help participants to optimize the allocation of their funds throughout the year to various retirement and healthcare programs to increase their accumulated savings at retirement and still cover their current and future out-of-pocket medical expenses in an efficient manner. In the following description the terms, "user," "participant," and "employee" are used interchangeably. Likewise, the term "savings dollars" and "contribution amount" are used interchangeably.

In one aspect, a computerized method is provided for optimizing savings benefits for an employee. The method includes receiving, by a computing device, from a graphical user interface input identifying a participant. Other information can be obtained about the participant, including salary information, state and federal tax information, out of pocket medical expenses, or other information related to health care and retirement of the participant. When this input about the participant is received, the computing device retrieves information identifying a plurality of financial accounts associated with the identified participant. The plurality of financial accounts comprises at least a retirement account associated with a retirement plan. The plurality of financial account can also comprise at least a retirement account associated with a qualified retirement plan. The retrieved information comprises at least annual limits on participant contribution amounts for the retirement account and previous contribution amounts deposited respectively in each of the financial accounts during the current year by the participant. The retrieved information can also comprise at least annual limits on participant contribution amounts for the qualified plan and all other accounts, including healthcare accounts (HSA), individual retirement accounts (IRA), taxable annuities, taxable accounts and previous contribution amounts deposited respectively in each of the financial accounts during the current year by the participant. The method further includes generating, by the computing device, partial year adjusted contribution limits for the plurality of financial accounts. The partial year adjusted contribution limits are derived from at least the annual limits and the previous contribution amounts. In some embodiments, the partial year adjusted contribution limits can further be calculated based on numerous other factors including age, compensation, and regulatory amounts. Further, the computing device then generates a savings hierarchy for a remaining part of the current year. The savings hierarchy is set of personalized steps based on the plurality of financial accounts, the retrieved information, and the partial year adjusted contribution limits, which represents an order for contributing savings dollars to the plurality of financial accounts for the remaining partial year to optimized the participants savings abilities. The method further involves receiving, by the computing device from the graphical user interface, input specifying a contribution amount that the participant wants periodically contributed to the plurality of financial accounts for the remaining partial year. Once the participant specified a contribution amount, the computing device then determines partial amounts of the contribution amount to be allocated to at least one of the financial accounts based on the savings hierarchy. These partial amounts are based on the savings hierarchy and threshold values associated with each step in the hierarchy such that the contribution amount is distributed among the plurality of accounts in a way that optimizes the savings dollars of the participant. Then the computing device transmits data representing the saving hierarchy with the partial amounts apportioned within the savings hierarchy for display on the graphical user interface. This display of the represented savings hierarchy conveys a recommended approach for allocating the user's contribution amounts to optimize their saving dollars potential.

In another aspect, this recommendation can later be accepted and implemented or changed by the user by altering the contribution amount. The graphical user interface is interactive such that the user can change the contribution amount to be distributed. The computerized method further comprises the computing device receiving input from the graphical user interface specifying an updated contribution amount to be periodically contributed to the plurality of financial accounts for a remaining part of the current year. The computing device then regenerates partial amounts for the updated contribution amount to be allocated to the at least one of the financial accounts based on the savings hierarchy. The computing device the displays on the graphical user interface an updated representation of the savings hierarchy with the partial amounts apportioned within the updated representation of the savings hierarchy.

In one embodiment, the computerized method comprises generating the savings hierarchy based on a predetermined set of rules for the plurality of financial accounts. For example, generating the savings hierarchy can be based on a marginal tax rate in retirement, such that if, for example, the marginal tax rate is higher in retirement, the savings hierarchy rules may provide that after-tax contribution is made to a retirement account, such as a Roth 401(k). However, if the computer device determines from the retrieved information that the marginal tax rate in retirement is lower in retirement, the savings hierarchy rules may provide that pre-tax contribution is made to a retirement account, such as a 401(k). Thus, the computerized method comprising generating the savings hierarchy based on tax related adjustments from the marginal tax rate in retirement.

In another embodiment, the computerized method further comprises retrieving, by the computing device, an employer match amount for at least one of the plurality of financial accounts. In some embodiments including a health care account associated with a health care plan, such as an HSA, the computerized method further comprises retrieving, by the computing device, an employer seed amount for at least one of the plurality of financial accounts, wherein the employer seed amount is a flat amount that varies by medical coverage level instead of an employer match contribution. When an employer match amount is obtained for the participant, the computing device further adjusts the partial year adjusted contribution limits for the plurality of financial accounts, the partial year adjusted contribution limits being derived from at least the annual limits, the previous contribution amounts, and the employer match amount. The savings hierarchy for the remaining partial year is then based on the plurality of financial accounts, the retrieved information, the partial year adjusted contribution limits, and the employer match amount.

In another embodiment, the computerized method further includes a plurality of accounts, where one of the financial accounts includes a high interest debt account. The information retrieved by the computing device for the high interest debt account includes at least a balance, an interest rate and a minimum payment amount. In some embodiments, predetermined rules will establish when savings dollars are used to pay off these high interest debt accounts. In another embodiment, the computerized method can also include a plurality of accounts with a health care account associated with a health care plan. The information retrieved by the computing device for the health care account information includes at least annual limits on participant contribution amounts for the health care account and previous contribution amounts deposited respectively in the health care account during the current year by the participant and employer. In another aspect, the computerized method further comprising generating the savings hierarchy to apportion the contribution amount to the health care account to cover at least an eligible spending amount specified by the health care plan.

In another embodiment, the computerized method includes a plurality of accounts including an IRA account. The retrieved information about the IRA account comprises at least a balance, annual limits on participant contribution amounts for the IRA account and previous contribution amounts deposited respectively in the IRA account during the current year by the participant. When an IRA account is included in the plurality of accounts, the computerized method further comprises determining IRA eligibility for partial amounts based on the partial year adjusted contribution limits and the retrieved information about the IRA account.

In another aspect, the computerized method further includes a representation of data as the savings hierarchy on a graphical user interface. The savings hierarchy is displayed as an object having sectors. Each sector represents a threshold value for one of the plurality of financial accounts and the placement of each sector represents the order of the savings hierarchy for the remaining partial year. Each sector is displayed on the graphical user interface having at least a first end and second end connected by an edge. The first end represents an initial amount of the financial account, such as an initial balance and or the previous contribution amounts to that account. The second end of the sector represents the threshold value of the financial account at that sector, or a value at which the rules of the savings hierarchy determine that enough funds have been contributed to the account at that particular step in the hierarchy. For example, the threshold value may be the minimum amount required to cover out-of-pocket expenses or obtain an employer match, or the threshold value may be the maximum amount that can be funded into an account. Once this threshold value is met, the computerized method moves to the next step in the savings hierarchy, i.e., contributes some or all of the remaining funds to the financial account in the next sector or step in the savings hierarchy order. The graphical user interface further includes an indicator that moves along the graphical object representation of the savings hierarchy. The computing device on the graphical user interface moves this indicator along the object in a manner to represent which financial accounts from the plurality of financial accounts receive contributions, i.e., partial amounts of the contribution amount. The indicator also represents the percentage of the threshold value for each of the plurality of financial accounts that is funded by the contribution amount in the savings hierarchy order.

In another aspect, the graphical user interface of the computerized method can further comprise displaying the object, by the computing device, in the shape of an arch. In this embodiment, the computerized method further comprises displaying the indicator, by the computing device, as a dial that rotates along the edge of the arch. In another aspect, the computerized method can further comprise the threshold value being represented as met for a sector when the indicator reaches the second end of the sector. Further, the computerized method comprises the graphical user interface representing allocating partial funds to the next sector in the order of the savings hierarchy when the threshold value is met by moving the indicator into the next sector. In another embodiment, the size of each sector is varied to represent the threshold value for the financial account of each sector.

In a further embodiment, the computerized method further comprises displaying each sector, by the computing device, having a first subsection and a second subsection. The first subsection represents a percentage of the threshold value funded by the contribution amount by the participant. The second subsection represents a percentage of the threshold value funded by an employer match amount.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIG. 1 shows an example of the graphical user interface page for receiving participant information.

FIG. 4 shows an exemplary configuration of the savings optimizer server on a network.

FIG. 7 provides an exemplary outline of the types of partial calculations made to various parameters of a few example financial accounts.

FIG. 8 provides a detailed flow chart of one embodiment of the process for generating the savings hierarchy with partial year calculations for an example participant.

DESCRIPTION OF THE INVENTION

Figure 2:
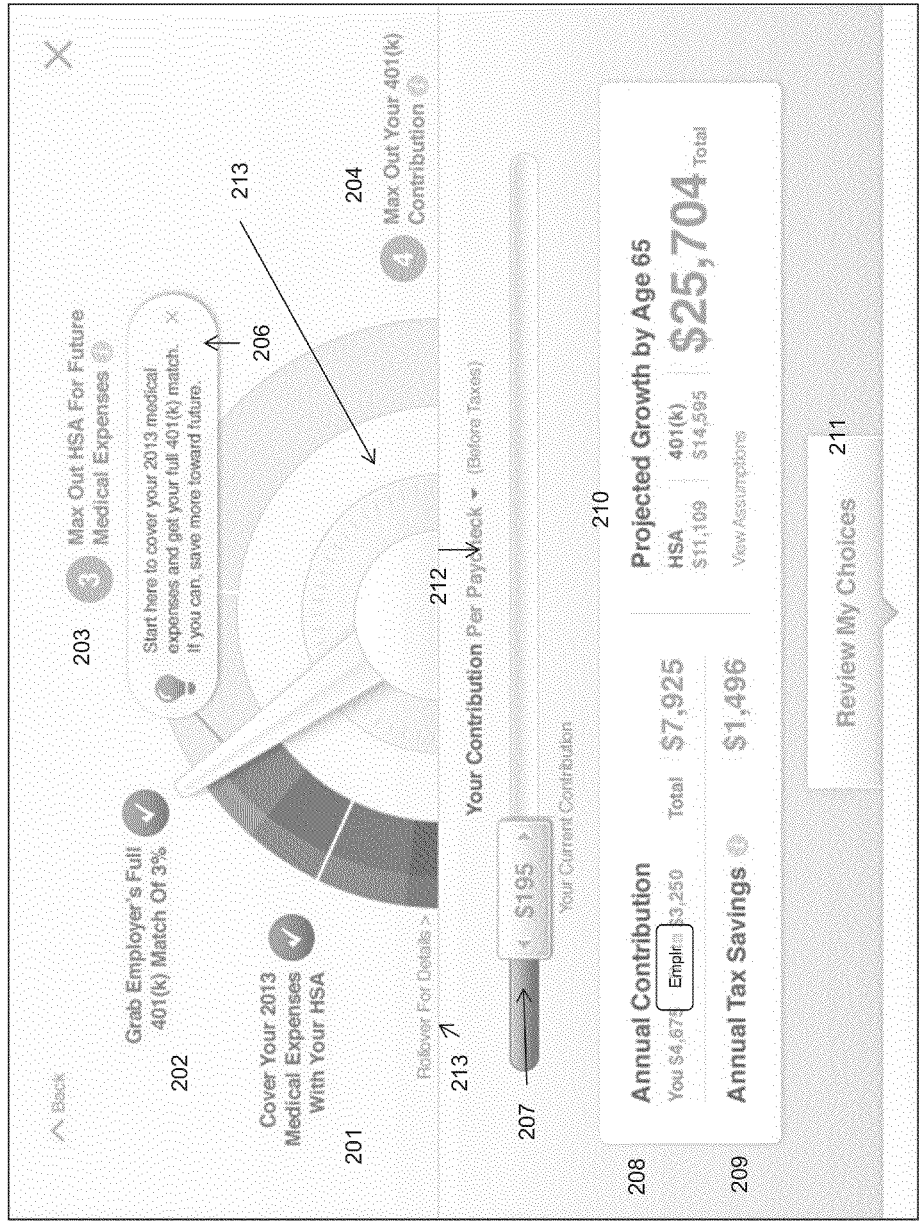
FIG. 2 shows an exemplary implementation of the graphical user interface representation of an example savings hierarchy for a participant.

Retirement and healthcare benefits are becoming intertwined due to the advent of HDHPs with HSAs and a continued shift to defined contribution (DC) retirement savings in which employers specify the amount of their contribution. These may be in addition to already complicated account portfolios with FSAs, IRAs, taxable and non-taxable accounts, taxable annuities, high interest debt accounts, etc. Additionally, people may want more control of these accounts to optimize their every day funds as well as their retirement funds to suit life events or even situational changes. For example, a person may want to take advantage of an increase in funds, stretch dollars in situations of decreased funds or simply alter their approach based on a situational change. To leverage these trends and provide the participant with great control, a framework is offered for both financial savings, including retirement and healthcare savings, as well as for partial year adjustments to allow for changes to contributions throughout the year regardless of whether a qualified life event has occurred. For example, if an individual has benefit plans or accounts set up, the individual's retirement and healthcare benefits can be simultaneously optimized by taking into account the individual's retirement income needs and healthcare situation as well as their current contributions so far that year.

FIG. 1 shows an example of the graphical user interface ("GUI") page for receiving participant information. In another embodiment, this GUI page or another GUI page can be used to obtain information identifying a participant. The participant or employee can be the user of the GUI, or the user can be someone logged into the system for the participant, such as a spouse or financial advisor. In this example of FIG. 1, the GUI receives input from the participant to confirm relevant information for optimizing the participant's savings dollars, including the participant's salary 100, their current federal tax rate 101 and their current state tax rate 102. In another embodiment, when the participant enters their salary information 100, the GUI will pre-populate the federal 101 and state 102 tax rates, which the user can than choose to override. This data is used to calculate tax savings and percentage of pay calculations. This information may also be retrieved from a participant database, employer database or other relevant database, rather than obtained directly from the user or participant. Further, the example GUI in FIG. 1 receives information from the user that estimates the participant's out-of-pocket expenses for the current year 103.

In one embodiment, the GUI provides a sliding tool 104 that allows the participant to estimate out-of-pocket medical expenses for the current year. In a further embodiment, the sliding tool 104 may provide indicators such that the participant can determine out-of-pocket expenses on the basis of whether they perceive these expenses as low 105, medium 106, high 107 or max 108. The sliding tool 104 may further provide a dollar value for each of these perceived expenses 105-108. The sliding tool 104 may further provide general guidance related to these perceived expenses 110. As exemplified in the illustrated example, the sliding tool 104 set at medium 106 out-of-pocket expenses provides the guidance 110 that this perceived level of expenses is related to "a minor condition that requires routine prescriptions and office visits." In a further embodiment, the participant is able to enter their own dollar amount 109 for estimated out-of-pocket expenses for the current year. This estimated out-of-pocket information provided by the participant is used to calculate the first step in the savings hierarchy, i.e., to calculate what is needed to cover the participant's medical expenses in the present year. In a further embodiment, the GUI tool may provide additional guidance through an introductory screen, which is presented to a novice user who requested more background on the tool prior to using it. This introductory screen may present simple facts illustrating the reason for looking at an HSA along side a 401(k) as a powerful retirement savings tool. For example, the introductory screen may provide facts to encourage the participant to save for retirement, such as "Your #1 retirement expense will be healthcare. The average retiree will spend about $125,000 on healthcare costs alone. Wouldn't it be nice to cover those costs without getting taxed? Well you can, by using your HSA to its maximum potential. Like your 401(k), your HSA will grow over time, but has one powerful difference: when you spend it on medical expenses, it won't count as income."

FIG. 2 shows exemplary implementation of the graphical user interface representation of an example savings hierarchy for a participant. FIG. 2 shows the GUI representation of an example savings hierarchy in the shape of an arch or dashboard view. The GUI representation of the savings hierarchy can also be linear, circular or any other shape. The dashboard or arch shape however is an easily understood representation of savings hierarchy that allows users to understand the dynamic numbers more quickly as it is similar to a car speedometer, dial or other dashboard. In one embodiment, the GUI representation of the savings hierarchy 213 is defaulted to a gauge or indicator 205 position that is based on a standard guidance contribution amount. For example, the indicator 205 may default to a position on the savings hierarchy 213 that places the participant's contribution amount 207 high enough to grab the participant's employer's full 401(k) match 202. In another embodiment, the GUI representation of the savings hierarchy 213 is defaulted to the client's current contribution amount election. For example, if the participant is currently contributing $195 per paycheck to financial accounts, the indicator 205 defaults to a position on the savings hierarchy 213 that shows how the $195 savings dollars per paycheck are allocated across one or more accounts per the steps 201-204 in the determined savings hierarchy 213. In the illustrated example, $195 as the participant's current contribution is enough to cover the participant's 2013 medical expenses with the participant's HSA account 201 as well as obtain the employer's full 401(k) match of 3% 202 for the participant's retirement plan.

As shown in the illustrated example of FIG. 2, the participant has an HSA account and a 401(k) account, however, based on what the participant is enrolled in, the savings hierarchy 213 and the steps 201-204 alter in use and appearance. Again, the savings hierarchy steps are personalized to the participant's accounts and benefit plans. For example, the participant may only have an HSA account, and therefore, the savings hierarchy 213 representation on the GUI only provides steps related to the HSA account. As another example, the participant may additionally have a FSA, IRA, Roth IRA, a taxable annuity, a taxable account, high interest debt account, or other financial account, and therefore, the savings hierarchy 213 representation on the GUI provides steps related to all these accounts associated with the participant. In another embodiment, the savings hierarchy only obtains information from qualified benefit plans, such as a qualified retirement account associated with a retirement plan, or a qualified health care account associated with a health care plan. In another embodiment, the GUI provides the participant the additional capability of selecting a health care plan when the health plan selection is unlocked, such as in a new hire situation. In another embodiment, the GUI is additionally capable of selecting a health plan for the participant when the participant is eligible as a way to recommend additional savings opportunity. In another embodiment, the GUI capability of selecting a health plan is locked for the participant, such as when the participant is doing a general evaluation of their accounts and contributions, or for example, when the situational change is only from a single plan to a family plan.

In some embodiments, the savings hierarchy can be programmed to include any variation of financial accounts that relate to the participant's current or future savings. Therefore, the savings hierarchy is personalized for each user. For example, some participants may not receive a company match or have a company match of less than 50%, and thus obtaining the company match may fall lower on the savings hierarchy, if, for example, the value of tax savings is greater than the value of the match. Thus, the steps of the hierarchy, and thereby the GUI representation of the steps, are matched to the participant's financial situation and potential. In another related aspect, the GUI representation is flexible and extensible to support future or additional accounts and support variations such as a participant without an HSA or without an employer match or an employer match of less than 50%. Additionally, in another embodiment, the GUI can also be used to display a representation of a savings hierarchy as described in the parent application, namely U.S. patent application Ser. No. 13/454,659.

As shown in the illustrated example of FIG. 2, the participant has an HSA account and a 401(k) account, and therefore, the savings hierarchy 213 at steps 201-204 optimizes the participant's contribution amount for these two accounts. Again, in the illustrated example, $195 as the participant's current contribution is enough to cover the participant's 2013 medical expenses with the participant's HSA account 201 as well as obtain the employer's full 401(k) match of 3% 202 for the participant's retirement plan. The savings hierarchy 213, however, shows via the dashboard representation, that the participant can contribute more to obtain more savings benefits. Using the interactive sliding tool 207, the participant can easily increase the periodic contribution amount 212. As the participant increases the contribution amount via the slider 212, the indicator 205 moves along the dashboard showing the increase, or decrease, and whether it is enough to obtain additional benefits. In the illustrated example, if the participant increased the contribution amount enough, the participant could additionally contribute enough per paycheck to max out the HSA account to cover future medical expenses 203, i.e., meet the next step 203 in the savings hierarchy 213. Further, once that step 203 is met, i.e., once the HSA account is maxed out for future medical expenses or the threshold value for that step is reached, the indicator 205 shows that further increases in the contribution amount are allocated to the account associated with the next step in the hierarchy. As shown in the illustrated example, if the HSA account is maxed out, further increases in the contribution amount are allocated to max out the participant's potential 401(k) contribution for the current year 204.

In another aspect, the gauge or indicator 205 reflects the steps in the hierarchy which are met as the user moves the slider to increase, or decrease, the contribution amount. The slider 207 is a key point of interaction for the user to indicate how much the participant can afford to save per period. In one embodiment, the slider 207 can simply be used for the user to observe the benefits of certain contribution amounts, and the contribution amount per period, here per paycheck, is not set until the user confirms the choice on a review screen 211. Although the slider 207 provides an easy mechanism for the user to view the benefits of the contribution amount increase or decrease, other tools may be used or alternatively the user could enter in the contribution amount manually. Regardless, once the contribution amount is entered into the system, via the slider 207 or other mechanism, the savings optimization engine calculates the savings, and represents the calculated savings by moving the indicator 205 along the savings hierarchy 213. Additionally, in another embodiment, the GUI may also provide a clear and simple value statement 208-210 to describe the value of the contributed savings dollars. For example, in FIG. 2, the GUI provides additional information to show the user the participant's total annual contributions 208, including breaking it down into the participant's contribution and the employer's contribution, as well as showing the participant the annual tax savings obtained by their periodic contribution. Further, in some embodiments, the GUI provides the participant with the projected growth of their contributions 210 (here in the example, the projected grown is by the age of 65), including breaking it down into the growth of their HSA account and their 401(k) account. In another embodiment, the GUI may provide information in addition to employer contributions, tax savings and future growth. For example, if the savings hierarchy also includes allocating funds to high interest debt account, additional information may provide the reduction of the debt over time.

In another embodiment, the GUI may provide additional options to the user to customize the savings hierarchy and or the contribution amount. For example, the user may be able to select how to view the contribution amount, such as selecting a period for how often the contribution amount is deducted from the participant's paycheck. The illustrated example provides a per paycheck contribution view 212, however, another embodiment may allow the user to change to view the contribution amount on a per month contribution or yearly contribution amount.

In another embodiment, further guidance may be provided to the user to encourage increased contribution amounts. For example, as shown in the illustrated embodiment, a light bulb popup window 206 may provide additional guidance when the user opens the GUI page. As shown, the light bulb 206 describes an initial default position at the second step in the hierarchy 202 stating that, by starting at that contribution amount, the participant covers "2013 medical expenses and gets a full 401(k) match" and encourages the user to contribution more to save more for the future. In another aspect, the GUI may provide a rollover capability 213 to provide additional information and guidance to the user regarding their contribution amount. In another aspect, the GUI may provide such additional information and guidance when the user pauses from moving the slider, showing a "hint" or light bulb, to encourage the user to save more and why saving more would be beneficial.

Figure 3:
FIG. 3 shows another exemplary implementation of the graphical user interface of FIG. 2.

FIG. 3 shows another exemplary implementation of the graphical user interface of FIG. 2. In FIG. 3, the rollover capability 213 of FIG. 2 is shown wherein the rollover link provides additional information 301-304, such that when the user mouses-over a segment in the representation of the savings hierarchy on the GUI, the details of the segment are shown. In another embodiment, such as with a touch-screen tablet, this feature is activated by the user's touch on a segment. This feature may provide, as in the illustrated example, a relative comparison of the participant's contribution 302 and the employer's contribution 303. This information can be relayed to the participant via simple text. In another embodiment, this information can be relayed to the participant via a graphical representation of the comparison of the participant and employer contributions 301-303. In a further embodiment, this feature 213 may provide further guidance or encouragement to the user to encourage further contribution. For example, in the illustrated example, the user is encouraged via additional guidance 304 stating, "Congrats! Your HSA will cover your expected medical expenses in 2013."

In another embodiment, the participant and employer contributions may be represented visually in the graphical representation of the savings hierarchy. For example, shading may be used in each step of the savings hierarchy, or as illustrated in FIGS. 2 and 3, in each sector of the arch shading may indicate how much of the funds at that step in the savings hierarchy is contributed by the participant and how much of the funds at that step is contributed by the employer. In another embodiment, additional rollover features 305 may be provided on the GUI hierarchy steps that give descriptions of the step including value statements. Such value statements may, for example, inform the participant the advantage of contributing enough to meet the next step in the hierarchy.

In a further embodiment, the user can select to implement the selected contribution amount and recommended allocation strategy provided by the saving hierarchy. In a further embodiment, the GUI may also include a review page, which allows the user to review the actual transaction modeled on the previous page by the selected contribution amount 207 and indicator 205, such that the actual transaction can be reviewed before it is generated and implemented. In this embodiment, the user can also use the GUI tool to implement their selections modeled on the representation of the savings hierarchy.

FIG. 4 shows an exemplary configuration of the savings optimizer server on a network. The savings optimizer server 420 receives information identifying a participant 440 at a user terminal or user-computing device when the user is connected to the server's network 430. When the savings optimizer server 420 receives information about a particular participant via the user at a user terminal 440, the savings optimizer server pulls or retrieves further information about the participant from various databases 410. For example, the server 420 may pull information from a database 410 containing the participant's healthcare account information or retirement account. Additionally, the server 420 may have access to a database 410 containing information about the participant or the employer. For example, the server 420 may pull inputs for calculations such as the participant's health plan information, IRS limits for retirement or health care accounts, personal household information such as age, salary and tax rates, health care utilization or expenses, and current contributions to benefit or financial accounts. Such information can be used as inputs to calculate eligibility determinations such as health plan eligibility, health account(s) eligibility, plan or platform constraints, and applied IRS limits. In another aspect, the server 420 may pull information from a database 410 related to relevant parameters such as those in FIG. 7.

Figure 5:
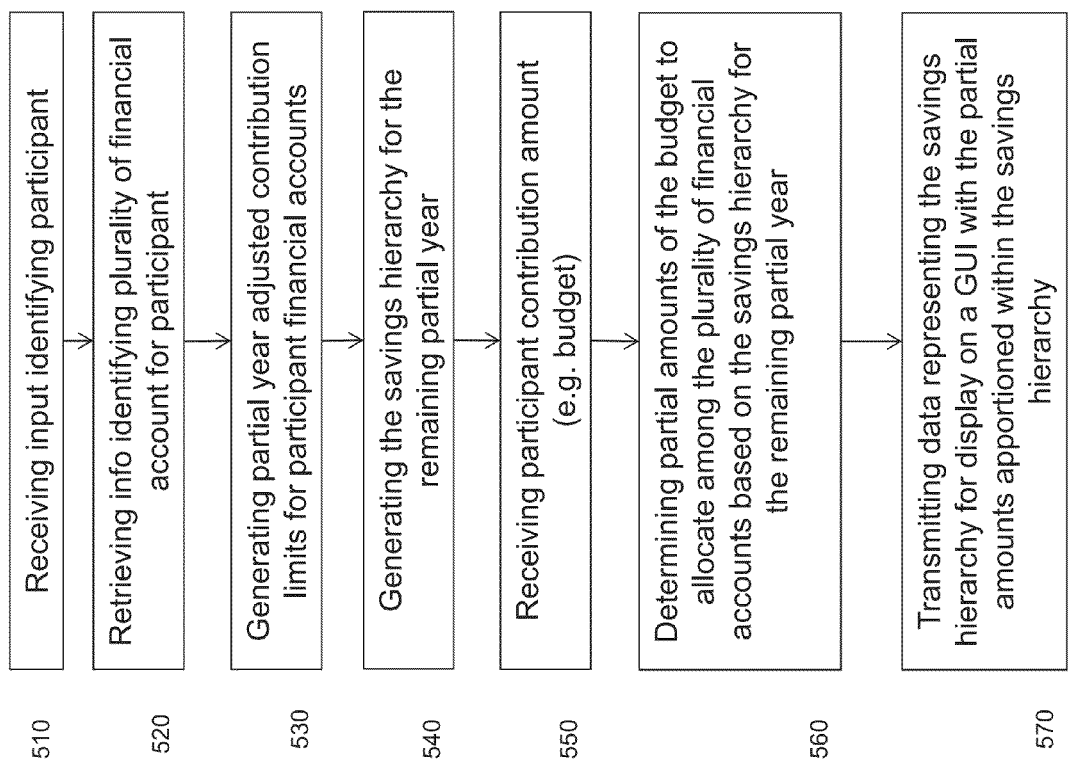
FIG. 5 is a flow chart demonstrating an exemplary process performed by the savings optimizer server for savings optimization.

FIG. 5 is a flow chart demonstrating an exemplary process performed by the savings optimizer server for savings optimization. The computer device or the savings optimizer server 420 on a computer device receives input over the network 430 identifying a participant 510. Once a participant is identified, the computer device can retrieve information 410 identifying a plurality of financial accounts 520 associated with the participant. Additionally, the computer device can retrieve information 410 related to the participant or the plurality of accounts. In one embodiment, the information retrieved can include health plan information such as the type of health plan (HMO, PPO, PPS, or HDHP), the coverage (i.e., family, individual, or individual plus one), premiums, deductibles, annual out-of-pocket maximums, and co-pays. In another embodiment, the information retrieved can include IRS limits and rules (for retirement and health accounts) such as workplace qualified plans, qualified compensation limits, personal retirement plans (such as traditional IRA or ROTH IRA), flexible spending accounts for health (full purpose) or flexible spending accounts for health (limited purpose), and health savings account information. In another embodiment, the information retrieved can include personal participant information such as age, state of residence, tax rate, tax rate expectations, earned income, marital status, children, and expectations of staying with the employer for longer duration. In another embodiment, the information retrieved can include health care utilization or expenditures such as expense assumptions for medical, preventative, vision, dental, and prescriptions, and or expense resolution rules per account such as full purpose FSAs, limited purpose FSAs and HSAs. In another embodiment, information retrieved can include participant current contribution such as intended salary deferral, contribution intentions for FSA, HSA, IRA, taxable annuities, taxable accounts and tax deferred accounts, current year to date balance for HSA and FSA.

In one embodiment, this retrieved information 520 is used as input for generating partial year adjusted contribution limits for the participant's financial accounts 530. Partial year adjustments to contribution limits 530 may be due to, for example, situational changes such as personal budget changes for retirement and health planning, health plan coverage changes via amount or for coverage for family, individual, or individual plus one, health savings account coverage changes from individual to family or vice versa, out-of-pocket medical expense changes adjusted to reflect change in medical status or to reflect alteration to household makeup, employer match criteria for retirement or health accounts, marginal and effective tax rate assumption changes, FSA utilization changes (full versus limited), health rewards criteria or participation changes, and tax-free eligibility changes for contribution, growth or withdrawal per state of residence. In another aspect, partial year calculations 530 may include pro-rated adjustments such as out-of-pocket expenses which are prorated per partial year, health plan premiums, deductibles, co-pays and annual out-of-pocket maximums, salary deferrals where contributions are limited to the 402g limit, total annual additions where contributions are limited to the 415 limit, and HSA contribution limits which may also depend on coverage. In another aspect, partial year calculations 530 may include input related to mid-year constraints such as the FSA state (open versus locked), and personal retirement savings type, utilization and amount.

In another aspect, the retrieved information 520 and the generated partial year adjusted contribution limits 530 are used to generate the savings hierarchy for the remaining portion of the partial year 540. The savings hierarchy is, as previously described, a personalized step by step order for funding various financial accounts to optimize the participant's savings dollars and periodic contribution amount, where the order is dependent at least in part on the types of accounts associated with the participant and the partial year adjusted contribution limits. Once this optimum order has been established 540, the GUI representation of the hierarchy is presented to the user on the computing device 440 over the network 430 such that the user can select the contribution amount to be deducted from their pay on a periodic basis, or the amount the participant can budget to contribute to the plurality of accounts 550. Once the user has selected, or as the user moves the selection tool or slider 207 to adjust the contribution amount, the periodic contribution amount or budget provided by the user can be used to determine partial amounts of this budget to allocate among the plurality of financial accounts based on the savings hierarchy for the remaining partial year 560. This data is transmitted to the user 440 over the network for display on a GUI with the partial amounts apportioned within the savings hierarchy graphical representation 570. In another aspect, the data transmitted, or the output, of the savings optimizer server may additionally take into account partial year considerations such as health savings plan periodic contribution elections, budget calculations to incorporate locked expenses and locked contributions, different recommendations for partial year versus following full years, and different account make up for the partial year versus the following years when projecting asset growth.

Figure 6:
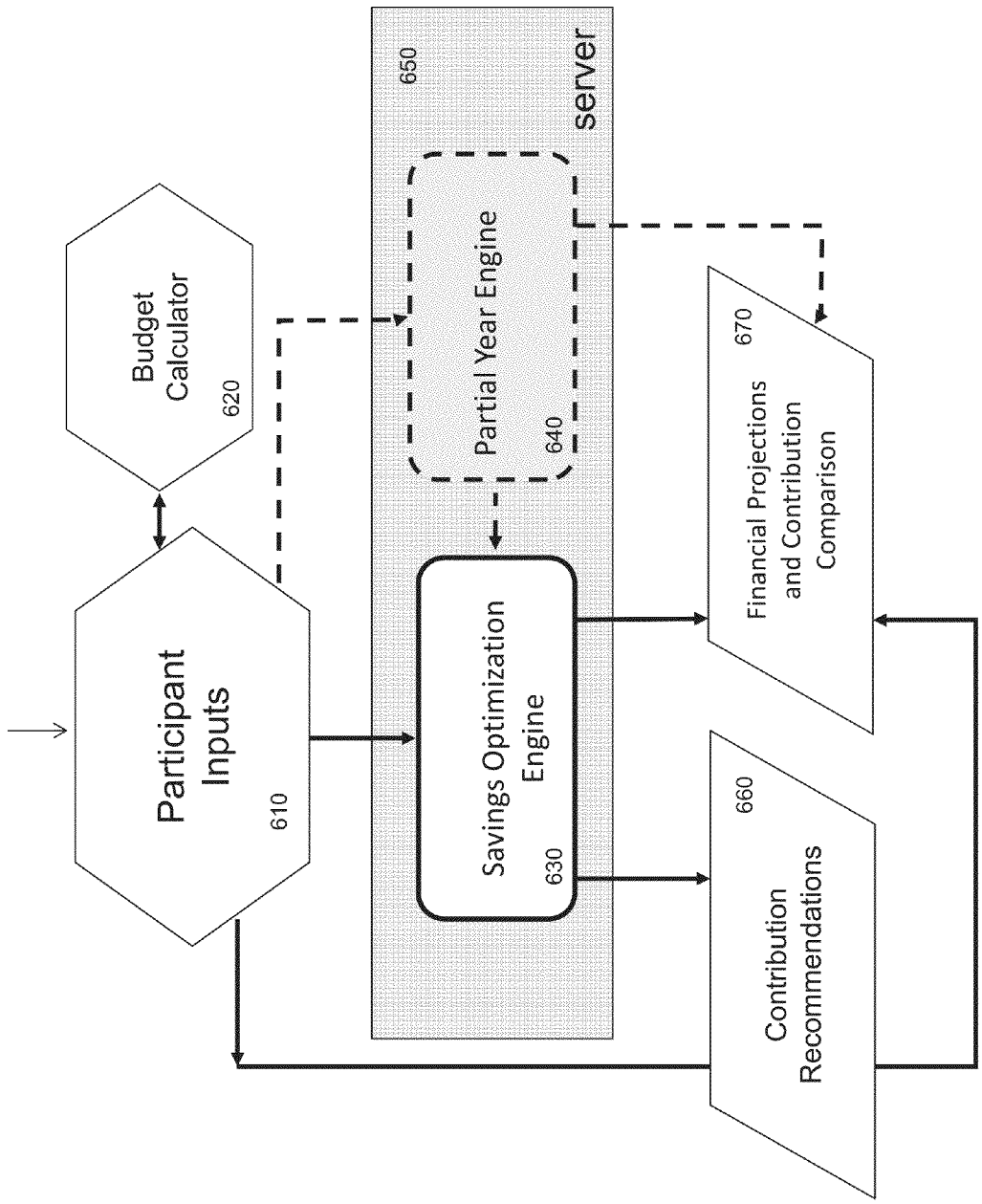
FIG. 6 is a diagram illustrating example process components including related inputs and outputs of the savings optimizer server.

FIG. 6 is a diagram illustrating example process components including related inputs and outputs of the savings optimizer server. According to one embodiment, participant related inputs are received by and retrieved by the savings optimizer engine on the computing device 610. Again, these inputs can include health plan information, IRS limits for retirement and health accounts, personal household information such as age or marital status, healthcare utilization or expenses, and current contributions. In another aspect, these inputs also include inputs from the budget calculator 620, which may include, for example, healthcare spending costs, healthcare savings costs, and retirement savings costs, which help determine the effect or deduction from the participant's pay. When the participant's budget is created or selected by the user 620, this information can then be used by the savings optimization engine 630 on the server 650, 420 to generate the savings hierarchy or contribution recommendations 660, financial projections for the current year or for the remaining portion of the partial year 670, as well as multi-year financial projections 670, such as the projected growth estimates 210. In another aspect, another part of the server 650, 420 or the partial year engine 640 is designated to calculate specifically the partial year adjusted contribution limits such that the savings hierarchy 660, financial projections and multi-year financial projections 670 are adjusted based on partial year calculations performed by the partial year engine 640. In another aspect, the partial year engine calculates the partial year adjusted contribution limits based on participant related adjusted, situational changes, locked contributions and tax related adjustments. Thus, in one embodiment, the savings optimizer server 650 can be used to optimize for a full or partial year and base the savings hierarchy on either full or partial year calculations. Additionally, in another aspect, the savings optimizer server 650 gives recommendations 660 such as, for example, healthcare contributions, qualified plan contributions or other financial account contributions. Further, in another aspect the savings optimizer server 650 can provide projections and comparisons 670 such as, for example, comparison between current and recommend contributions, single year financial projections and multi-year projections.

FIG. 7 provides an exemplary outline of the types of partial calculations made to various parameters of a few example financial accounts. Partial year adjustments will vary based on the type of account and the type of parameter. Therefore, in one aspect, for example, a healthcare account may have various parameters retrieved as input for the computerized method, such as HSA-eligible expenses, employer HSA contributions, deductibles, out-of-pocket expenses, HSA limits and FSA-eligible expenses. These inputs, however, are treated differently when performing partial year calculations. For example, HSA-eligible expenses, employer HSA contributions and FSA-eligible expenses are prorated for the partial amount of the year remaining. In another aspect, deductibles and out-of-pocket expenses for healthcare accounts are calculated as annual, i.e. as the full annual value without adjustment. In a further aspect, HSA limits are calculated based on a weighted adjustment where everything is weighted and then prorated values across the year are added. For a 401(k) account though, for example comparison, in another aspect maximum compensation and health rewards are adjusted on ruled-based or two-step conditional logic, whereas the 415 limit and 402(g) limit for the 401(k) account are adjusted or reconciled such that any locked contribution value is carried over and taken account of during the partial year calculations, i.e., such that what the participant has already saved or spent is incorporated into the calculation for partial year.

FIG. 8 provides a detailed flow chart of one embodiment of the process for generating the savings hierarchy with partial year calculations for an example participant. In one embodiment, the computerized method or process 980 creates the savings hierarchy, or set of steps is created, personalized, for the identified participant. In this example, the participant has or is eligible for an HSA, FSA, 401(k), high interest debt, IRA, Roth IRA, and at least one additional tax-deferred annuity or taxable account. In one aspect, the process determines 810 an amount for the participant or employee to withdraw in the upcoming year from the HSA account. In one embodiment, if the process occurs during the annual election period or after a qualified life event 940, no partial year calculation is needed for this step 950. However, if this process occurs during the current benefit year and or due to a situational change that is not a qualified life event 940, partial year calculations are necessary and are performed 960 by the partial year engine 640 before moving on to the next step in the process.

In one embodiment, after the employee withdraws this amount 810, any remaining HSA eligible expenses can be determined such that the GUI can recommend the participant contribute to the HSA for any remaining eligible healthcare spending 820. After the remaining eligible healthcare spending is covered 820, the next step estimates an amount for the employee participant to contribute to the FSA such that the participant contributes to the FSA account for any remaining eligible spending 830. If money is still available, the next step determines the amount needed to get the employer 401(k) match for the participant 840. After the employer match is obtained, available contribution funds are used to max out the FSA account for any eligible expenses, after which the HSA account contributions are reviewed 850. If the HSA is not at its limit, available contribution funds are then used to max out the HSA account until the contribution limit is met 860. Again, in some embodiments including a health care account associated with a health care plan, such as an HSA, the computerized method further comprises estimating the amount necessary to obtain an employer seed amount, wherein the employer seed amount is a flat amount that varies by medical coverage level instead of an employer match contribution. The employer seed amount can then be utilized in the partial year contribution limit adjustments as part of calculating the max for the HSA account. If possible, the FSA and HSA accounts can be consolidated 870. Next, if the participant has any high interest debt accounts, available contribution funds are utilized to pay these high interest debts off and or used to pay the debts down 880. If there is still remaining contribution funds, and or no high interest debt accounts are included, the next step uses available funds to max out the participants 401(k) and contributes to an IRA if possible 890. After which, available contribution funds are used to further contribute to a Roth IRA if available. If further contribution funds are available, the HSA is saved instead of spent on eligible expenses 910, and remaining contribution funds are contributed to a traditional after-tax IRA 920. Last, if there are still remaining funds, these are contributed to a tax-deferred annuity or other available taxable financial savings account 930. Again, each step 810-930 is subject to partial year calculations, if needed, by the partial year engine 970. In one embodiment, the partial year engine 970 calculates partial year adjustments 960 based on the received and retrieved participant information, adjustments such as compensation, and healthcare out-of-pocket expenses, etc., and or incorporates locked contributions already made by the participant. In some embodiments, the partial year engine 970 prorates or adjusts IRS limits for HSA, 402(g), 415, IRA, catch-ups, and maximum includable compensation, as well as incorporates calculations based on income increases or reductions where appropriate.

The following two cases provide a more in depth discussion of the process illustrated in the FIG. 8 flow chart. Case 1 provides a look at enrollment by the participant for the full upcoming year. Case 2 provides a look at a mid-year enrollment by a participant for the rest of the year where partial year calculations are needed.

Case 1 represents a hypothetical where enrollment by the employee or participant is at annual enrollment for the full upcoming year (or occurs anew at a qualified life event) for an employee whose current marginal tax rate is same or higher than his expected marginal tax rate in retirement. In addition, the employee is eligible to participate in: 1) one or more retirement savings accounts including a 401(k) plan and at least one IRA, 2) a medical insurance plan including a HDHP, and 3) one or more medical savings accounts including a HSA and a limited FSA.

The process 980 starts at step 810 with the assumption that zero employee contributions have been made to a qualified plan (e.g., a 401(k) plan), IRA, annuity, FSA or HSA. In some embodiments, the only contributions that have been made at step 810 include profit sharing contributions and HSA contributions by an employer. Another assumption of the process 980 is that dollars are allocated incrementally up to a given budget an employee has available to contribute for each step of the process 980. In some embodiments, the process 980 returns an error message if the employee allocates a budget less than the minimum funding level required by a step. For example, the savings budget is an input from the user and the minimum funding level should cover the expected out-of-pocket healthcare expenses for the coming year. A savings budget less than the minimum funding level is not workable and should return an error message to the participant. Once the minimum funding level is reached after step 830, the calculations for next steps represent the top of the funding level, or the threshold value, for each step. Thus dollars are allocated incrementally up to the given budget. Generally the savings budget is reached within a step of the savings hierarchy, rather than at the end of a step.

At step 810, the process 980 determines an amount for the employee to withdraw in the upcoming year from the HSA. In some embodiments, this amount Annual_Withdrawal) is the smaller of the employee's estimated eligible expenses under the HSA (HSA_Eligible_Expenses) and the sum of existing HSA balances at the beginning of the plan year (if any) and an amount of employer contribution to the HSA (HAS_Company). Generally, the HSA eligible expenses include healthcare expenses not covered by a healthplan and qualified medical expenses, as determined by the Internal Revenue Service. The HSA withdrawal amount can be determined by the following equation:

$$Annual\_Withdrawal = MIN(HSA\_Eligible\_Expenses, HSA\_Company). \quad (Eq. 1)$$

After the employee withdraws this amount, any remaining HSA eligible expenses can be determined by the following equation:

$$Remaining\_HSA\_Eligible\_Expense = HSA\_Eligible\_Expenses - Annual\_Withdrawal. \quad (Eq. 2)$$

The remaining HSA eligible expenses, if any, represent the estimated HSA expenses in excess of the employer HSA contribution. In some embodiments, the remaining HSA eligible expenses constitute after-tax healthcare expenses to be paid by the employee with after-tax, out-of-pocket dollars.

At step 820, the process 980 estimates an additional amount the employee can withdraw at the beginning of the upcoming year from the HSA, which can be up to the remaining HSA-eligible expenses, if any, computed from Eq. 2. This amount can be used to partially or fully cover the remaining HSA eligible expenses from Eq. 2. In some embodiments, the additional amount is only available for withdrawal by the employee in the upcoming tax year if there is an existing HSA balance (HSA_Existing_Balance), which includes prior contribution carried over from one or more previous tax years that were not spent by the employee in the previous years. At this point, the running total of HSA withdrawal by the employee (HSA_Annual_Withdrawal), including the withdrawal amount made in step 810, can be determined by the following equation:

$$HSA\_Annual\_Withdrawal = MIN(HSA\_Eligible\_Expenses, HSA\_Company + HSA\_Existing\_Balance). \quad (Eq. 3)$$

In addition, any remaining HSA eligible expenses are determined according to the following equation:

$$Remaining\_HSA\_Eligible\_expense = HSA\_Eligible\_Expenses - HSA\_Annual\_Withdrawal. \quad (Eq. 4)$$

In some embodiments, the remaining HSA eligible expenses constitute after-tax healthcare expenses to be paid by the employee with after-tax, out-of-pocket dollars.

At step 820, the process 980 determines an amount for the employee to contribute to the HSA (HSA_Employee), which the employee can later withdraw from the HSA to cover the remaining HSA eligible expenses, if any, determined from Eq. 4. In some embodiments, the employee contribution amount (HSA_Employee) is up to the contribution limit of the HSA:

$$HSA\_Employee = MIN(AT\_After\_FSA\_HSA, IF(bMarried, HSA\_Limit\_Married - HSA\_Company, HSA\_Limit\_Single - HSA\_Company)). \quad (Eq. 5)$$

In Eq. 5, the variable AT_After_FSA_HSA represents the after-tax amount the employee spent on healthcare after taking into account of deposits into and withdrawals from the employee's FSA and/or the HSA. According to Eq. 5, if the employee is married, as indicated by the Boolean b_Married, the employee's HSA contribution limit is different from his contribution limit if he were single. At this point, the running total of HSA withdrawal amount (HSA_Annual_Withdrawal), including the withdrawal amount made in steps 810, can be determined by the following equation:

$$HSA\_Annual\_Withdrawal = MIN(HSA\_Eligible\_Expenses, HSA\_Company + HSA\_Existing\_Balance + HSA\_Employee). \quad Eq. 6)$$

In some embodiments, the process 980 can additionally instruct the employee to make a catch-up contribution to the HSA if the employee is eligible and if there are remaining after-tax healthcare expenses. Total employee withdrawal up to the catch-up contribution amount to cover the remaining eligible expenses can be computed in a manner similar to Eq. 6. In some embodiments, any remaining HSA eligible expenses after the withdrawal constitute after-tax healthcare expenses to be paid by the employee with after-tax, out-of-pocket money.

At step 830, the process 980 estimates an amount for the employee to contribute to the FSA (FSA_employee), which can be up to the smaller of any remaining after-tax healthcare expenses (AT_After_FSA_HSA) and eligible FSA expenses. This amount, as computed according to Eq. 7, can be withdrawn by the employee throughout the tax year as needed. In some embodiments, the FSA contribution amount (FSA_employee) is zero if, for example, there are no remaining after-tax healthcare expenses.

$$FSA\_Employee = MIN(MAX(AT\_After\_FSA\_HSA, 0), FSA\_Eligible\_Expenses). \quad (Eq. 7)$$

At step 840, the process 980 estimates an amount for the employee to contribute pre-tax to a qualified plan, such as to a 401(k) plan, on a pre-tax basis. This amount can be up to the matching contribution limit subjected to two options. Option 1 involves setting a Boolean flag bEmployerContributionsVested, which is set to true if employer contributions are already vested or are expected to vest before the employee separates from service (e.g., leaves the employer). Otherwise, this Boolean flag is set to false. In some embodiments, the default setting for this flag is true. If the bEmployerContributionsVested flag is set to true, the process 980 is adapted to instruct the employee to contribute up to the matching contribution limit of the qualified plan. If the flag is set to false, the process 980 is adapted to instruct the employee to contribute to the qualified plan up to the plan's Sec. 402(g) limit only after the employee has contributed to the maximum allowable limit of the HSA. This may mean that step 840 is not executed.

Option 2 involves setting a Boolean flag bMatchTo415LimitOnly, which is set to true by the process 980 if employee contributions to the qualified plan is made to the extent that the contributions are expected to be matched, such as up to the Sec. 415 limit of a 401(k) plan. As an example, for an employee whose annual income is $300,000, at most $255,000 of that income (the maximum limit for 2013) is used as compensation for contribution purposes to a qualified plan. If the employer's expected profit sharing rate in this case is 12%, this translates to a profit sharing amount of $30,600 ($245,000*0.12=$30,600). This also means that only $20,400 remains for both employee contributions and employer matching contributions ($51,000−$30,600=$20,400), where the $51,000 amount represents the maximum allowable contributions to a qualified plan (e.g., the Sec. 415 limit) for the year 2013, including both employee and employer contributions. Assuming a dollar-for-dollar match up to 10%, the employee contributes $10,200 ($20,400−$10,200=$10,200), which is far less than the Sec. 402(g) limit of $17,500 for 2013. Since whole percentage contributions are generally required, employee contribution is rounded up to the nearest whole percentage that satisfies the maximum allowed contribution. In this example, the employee contribution is 4%. Therefore, if the flag bMatchTo415LimitOnly is set, then $10,200 of the employee's income is allocated to the 401(k) rather than the possible limit of $17,500 for 2011. In some embodiments, the process 980 can suggest to the employee to put this difference (i.e., $17,500−$10,200=$7,300) in one or more of the other accounts, such as in the HSA. (Note, if the 402(g) limit is reached for 2013, the employee would contribute 7% which is $255,000*0.07=$17,850 which is then limited to $17,500.) In budget constrained situations the application of the option can make a real difference and would result in funding or not funding the HSA.

There can be a risk associated with the second option when the bMatchTo415LimitOnly is set. For example, if the option is applied and expected profit sharing contributions do not materialize, the employee can end up foregoing additional employee contributions and employer matching contributions. Using the example above, suppose profit sharing contributions is 6% instead of 12%, then after $15,300 in profit sharing contributions ($255,000*0.06=$15,300) is made, a total of $35,700 for employee contributions and employer matching contributions remains for the year 2013 ($51,000-$15,300=$35,700). Thus, in hindsight the employee could have made the full $17,500 contribution up to the 402(g) limit, instead of only $10,200.

In contrast, when the bMatchTo415LimitOnly flag is set to false, the employee can contribute up to the Sec. 402(g) limit. Using the same example above, if profit sharing contributions are indeed 12%, then $7,300 plus earning is refunded to the employee in the following year and the $7,300 in employer matching contributions (plus earnings) is forfeited in the current year. While there is no penalty to having this money refunded to the employee in the following year, the risk is one of lost opportunity. The $7,300 could have been contributed in 2011 to other accounts, such as to the HSA. Hence, for some individuals, making the full $17,500 contribution to the 401(k) plan in 2013 means forgoing the ability to take full advantage of the HSA in the same tax year.

At step 850, the process 980 estimates another amount for the employee to contribute to the FSA (FSA_Employee), which can be the minimum of any eligible FSA expense (FSA_Eligible_Expenses) and the FSA contribution limit (FSA_Contribution_Limit). In some embodiments, the employee can make withdrawals throughout the year from the FSA up to the FSA contribution amount (FSA_Employee) as needed. The FSA amount can be determined using the following equation:

$$FSA\_Employee=MIN(FSA\_Eligible\_Expenses,FSA\_Contribution\_Limit). \quad (Eq. 8)$$

In some embodiments, by contributing to the FSA, the process 980 needs to reduce the HSA eligible expenses because the HSA expenses are being assumed by the FSA. Hence, the total HSA withdrawal amount (HSA_Annual_Withdrawal) from Eq. 6 is adjusted according to the equation below:

$$HSA\_Eligible\_Expenses=HSA\_Eligible\_Expenses-FSA\_Employee$$

$$HSA\_Annual\_Withdrawal=MIN(HSA\_Eligible\_Expenses,HSA\_Company+HSA\_Existing\_Balance+HSA\_employee) \quad (Eq. 9)$$

In some embodiments, the process 980 also instructs the employee to make catch-up contributions to the HSA if the employee is eligible and if there are still remaining after-tax healthcare expenses (AT_After_FSA_HSA) that can be covered by the catch-up contributions.

At step 860, the process 980 determines an amount for the employee to contribute to the HSA up to the HSA limit, including any catch-up contributions if available. In some embodiments, no employee HSA contribution is made at step 860 because the HSA limit has already been reached due to actions taken in the prior steps. The amount of employee contribution to the HSA, if possible, can be computed according to the following equation:

$$HSA\_Employee=IF(bMarried,HSA\_Limit\_Married-HSA\_Company,HSA\_Limit\_Single-HSA\_Company). \quad (Eq. 10)$$

In addition, if catch-up contributions to the HSA are available, these contributions can be computed using the following equation:

$$HSA\_Catchup=IF(currentAge>catch\_up\_Age\_HSA,catch\_up\_Limit\_HSA) \quad (Eq. 11)$$

In some embodiments, catch-up contributions are only available to the employee if the employee satisfied an age threshold (currentAge).

At step 860, if the budget finishes up by this step, the process 980 reviews the healthcare account contributions. At step 870, if HSA limit is not maxed out, the process 980 consolidates the healthcare contributions into a single HSA account if possible (HSA accounts are preferred over FSAs as HSA balances can be rolled over, as opposed to the use-it-or-lose-it nature of FSAs). Consolidation is possible if there are no exclusive FSA-eligible expenses and the healthcare spending (HSA withdrawal and FSA withdrawal) can be covered given the HSA balances, employer HSA contributions and employee HSA contributions.

In some embodiments, an additional step, step 880, the process 980 pays off any high interest debt to the extent possible. The interest rate on the debt is assumed be sufficiently higher from the long-term return assumptions. This would be true for most credit card loans and unsecured personal loans. In some embodiments, the budget is adjusted to pay off this loan and the payment would be recorded as an after-tax expense.

At step 890, if the marginal tax rate is the same or lower in retirement, the process 980 determines an amount for the employee to contribute on a pre-tax basis to the qualified plan of step 840, such as to the 401(k) plan, up to the contribution limit of the plan. In some embodiments, if the employee is 50 years or older, the employee is allowed to contribute to the catch-up limit of the 401(k) plan as well. At step 890, if the marginal tax rate is higher in retirement, the process 980 determines the participant will contribute after-tax to the Roth 401(k) to the contribution limit. If the participant age is 50 or over, contribution is made to the catch-up limit as well.

At step 890, the process 980 determines an amount for the employee to contribute on a pre-tax basis to his IRA and/or the spouse's IRA, up to the contribution limit of the IRAs. Each of the IRAs can be a traditional IRA or a Roth IRA.

At step 900, the process 980 determines an amount for the employee to contribute on an after-tax basis to his Roth IRA and/or the spouse's Roth IRA, up to the contribution limit of the IRAs.

At step 910, the process 980 determines an amount for the employee to contribute to the HSA, but prevents the employee from making any withdrawal of HSA eligible expenses from the HSA. Instead, the employee is instructed to pay these expenses with after-tax, out-of-pocket dollars. Because a HSA allows tax-free withdrawal for qualified medical purposes, contributions to the HSA at step 910 provide a similar meaning for employee future retirement savings as contributing on an after-tax basis to a Roth IRA in step 900. However, contributing on an after-tax basis to a Roth IRA may be preferred because withdrawals from a Roth IRA are tax free for any purposes, assuming that the employee meets the 5-year aging requirement and the minimum age requirement for withdrawal. In contrast, withdrawals from a HSA are only tax free for qualified medical expenses. Therefore, in some embodiments, step 910 is not executed if the employee wants to consolidate his investment into the Roth IRA.

At step 920, the process 980 determines an amount for the employee to contribute on an after-tax basis to a traditional IRA and/or the spouse's traditional IRA, up to the contribution limit of the traditional IRAs. The process 980 can also recommend the employee to contribute on an after-tax basis to one or more tax-deferred annuities or efficient taxable accounts. In some embodiments, the process 980 directs the employee to invest in a tax-deferred annuity if the tax advantage of the tax deferral minus annuity account fees outweighs the tax advantage of lower capital gain rates by investing in a taxable account.

At step 930, the process 980 determines any remaining amount for the employee participant to be contributed to an additional tax-deferred annuity or taxable account. A boolean value, bAfterTaxIRA, is set to true if contributions are invested in anything except highly efficient equities or highly efficient equity mutual funds. Basically, if the tax advantage of tax-deferral (but taxed as ordinary income) after annuity account fees outweighs the tax-advantage of lower capital gains rates on some or all of the taxable account investment, then the process 980 direct the contributions to the after-tax deferred annuity.

Case 2 represents a hypothetical look at a mid-year enrollment by a participant for the rest of the year where partial year calculations are needed.

For Case 2, the process 980 starts at step 810 with the assumption that zero or non-zero employee contributions have been made to the qualified plan (e.g. 401(k)), IRA, Annuity, FSA, and HSA. In some embodiments, apart from the employee contributions, there may also be employer profit sharing contributions and employer HSA contributions. In some embodiments, at step 810, there may or may not be employer matching contributions depending on if it's a new employee or a mid-year review. This process again solves for 1) when marginal tax rate is the same or lower in retirement or 2) when marginal tax rate is higher in retirement.

In another aspect, the savings budget is an input from the user and the minimum funding level should cover the expected out-of-pocket healthcare expenses for the rest of the year. In some embodiments, a savings budget less than the minimum funding level is not workable and the process 980 returns an error message to the participant. In some embodiments, once the minimum funding level is reached after 830, the calculations for next steps represent the top of the funding level for each step. Another assumption of the process 980 is that dollars are allocated incrementally up to the given budget an employee has available to contribute for each step of the process 980. Generally the savings budget is reached within a step of the savings hierarchy, rather than at the end of a step.

At step 810, the process 980 determines an amount for the employee to withdraw in the upcoming year from the HSA. In some embodiments, this amount (Annual_Withdrawal) is the smaller of the employee's estimated eligible expenses under the HSA (HSA_Eligible_Expenses) and the sum of existing HSA balances prior to the mid-year review (if any) (HSA_Existing_Balances) and the employer HSA contribution (if any) (HAS_Company). Generally, the HSA eligible expenses include healthcare expenses not covered by a health plan and qualified medical expenses, as determined by the Internal Revenue Service. The HSA withdrawal amount can be determined by the following equation:

$$Annual\_Withdrawal=MIN(HSA\_Eligible\_Expenses, HSA\_Company+HSA\_Existing\_Balances). \quad (Eq. 1)$$

After the employee withdraws this amount, any remaining HSA eligible expenses can be determined by the following equation:

$$Remaining\_HSA\_Eligible\_Expense=HSA\_Eligible\_Expenses-Annual\_Withdrawal. \quad (Eq. 2)$$

The remaining HSA eligible expenses, if any, represent the estimated HSA expenses in excess of the employer HSA contribution. In some embodiments, the remaining HSA eligible expenses constitute after-tax healthcare expenses to be paid by the employee with after-tax, out-of-pocket dollars.

In embodiments for partial year calculations, HSA-eligible expenses and employer HSA contribution are recalculated 960 by the partial year engine 970. These calculations 960 would default to proration 700, unless otherwise mandated by the plan specifications. While actual expenses (like office visits, medical supplies, and preventive co-pays) may be prorated, deductibles and OOP maximums would still be annual. Note, in some embodiments, plan details may override these default assumptions.

At step 820, the process 980 determines an amount for the employee to contribute to the HSA (HSA_Employee), which the employee can later withdraw from the HSA to cover the remaining HSA eligible expenses, if any, determined from Eq. 2 In some embodiments, the employee contribution amount (HSA_Employee) is up to the contribution limit of the HSA:

$$HSA\_Employee=MIN(AT\_After\_FSA\_HSA,IF (bMarried,HSA\_Limit\_Married-HSA\_Company, HSA\_Limit\_Single-HSA\_Company)). \quad (Eq. 3)$$

In Eq. 3, the variable AT_After_FSA_HSA represents the after-tax amount the employee spent on healthcare after taking into account of deposits into and withdrawals from the employee's FSA and/or the HSA. According to Eq. 3, if the employee is married, as indicated by the Boolean b_Married, the employee's HSA contribution limit is different from his contribution limit if he were single. At this point, the running total of HSA withdrawal amount (HSA_Annual_Withdrawal), including the withdrawal amount made in steps 810, can be determined by the following equation:

$$HSA\_Annual\_Withdrawal=MIN(HSA\_Eligible\_Expenses,HSA\_Company+HSA\_Existing\_Balance+HSA\_Employee). \quad (Eq. 4)$$

In some embodiments, the process 980 can additionally instruct the employee to make a catch-up contribution to the HSA if the employee is eligible and if there are remaining after-tax healthcare expenses. Total employee withdrawal up to the catch-up contribution amount to cover the remaining eligible expenses can be computed in a manner similar to Eq. 4. In some embodiments, any remaining HSA eligible expenses after the withdrawal constitute after-tax healthcare expenses to be paid by the employee with after-tax, out-of-pocket money.

In embodiments for partial year calculations, HSA limits are recalculated 960 by the partial year engine 970. For example, HSA limits can change if the participant is covered as Single or as Family. Thus in some embodiments, the proration 700 would be a two-step process for such changes. In some embodiments, the participant may have already made some contributions to the HSA in this year, so the limits require further adjustment 960 to reflect that. All other variables are computed 960 the same as in 810. As an example, the limits of HSA for Single and Family are $3,250 and $6,450 respectively in 2013. Subsequently, for someone who changes the HSA deferral from July 1 onwards after getting married, the new limit would be $4,850 for the whole year. If this person has already contributed $1,800 so far, the effective limit for this person would be $3,050 for the remainder of the year.

At step 830, the process 980 estimates an amount for the employee to contribute to the FSA (FSA_employee), which can be up to the smaller of any remaining after-tax healthcare expenses (AT_After_FSA_HSA) and eligible FSA expenses. This amount, as computed according to Eq. 5, can be withdrawn by the employee throughout the tax year as needed. In some embodiments, the FSA contribution amount (FSA_employee) is zero if, for example, there are no remaining after-tax healthcare expenses.

$$FSA\_Employee=MIN(MAX(AT\_After\_FSA\_HSA, 0),FSA\_Eligible\_Expenses). \quad (Eq. 5)$$

In embodiments for partial year calculations, FSA-eligible expenses are recalculated 960 by the partial year engine 970. In some embodiments, the FSA account may be locked after the annual enrollment and may not be available to new employees joining mid-year. Similar to HSA, in some embodiments these calculations are prorated 700. Further, in some embodiments, while actual expenses (like office visits, medical supplies, and preventive co-pays) are prorated, deductibles and OOP maximums are still annual 700.

At step 840, the process 980 estimates an amount for the employee to contribute pre-tax to a qualified plan, such as to a 401(k) plan, on a pre-tax basis. This amount can be up to the matching contribution limit subjected to two options. Option 1 involves setting a Boolean flag bEmployerContributionsVested, which is set to true if employer contributions are already vested or are expected to vest before the employee separates from service (e.g., leaves the employer). Otherwise, this Boolean flag is set to false. In some embodiments, the default setting for this flag is true. If the bEmployerContributionsVested flag is set to true, the process 980 is adapted to instruct the employee to contribute up to the matching contribution limit of the qualified plan. If the flag is set to false, the process 980 is adapted to instruct the employee to contribute to the qualified plan up to the plan's Sec. 402(g) limit only after the employee has contributed to the maximum allowable limit of the HSA. This may mean that step 840 is not executed.

Option 2 involves setting a Boolean flag bMatchTo415LimitOnly, which is set to true by the process 980 if employee contributions to the qualified plan is made to the extent that the contributions are expected to be matched, such as up to the Sec. 415 limit of a 401(k) plan. As an example, for an employee whose annual income is $300,000, at most $255,000 of that income (the maximum limit for 2013) is used as compensation for contribution purposes to a qualified plan. If the employer's expected profit sharing rate in this case is 12%, this translates to a profit sharing amount of $30,600 ($245,000*0.12=$30,600). This also means that only $20,400 remains for both employee contributions and employer matching contributions ($51,000−$30,600=$20,400), where the $51,000 amount represents the maximum allowable contributions to a qualified plan (e.g., the Sec. 415 limit) for the year 2013, including both employee and employer contributions. Assuming a dollar-for-dollar match up to 10%, the employee contributes $10,200 ($20,400−$10,200=$10,200), which is far less than the Sec. 402(g) limit of $17,500 for 2013. Since whole percentage contributions are generally required, employee contribution is rounded up to the nearest whole percentage that satisfies the maximum allowed contribution. In this example, the employee contribution is 4%. Therefore, if the flag bMatchTo415LimitOnly is set, then $10,200 of the employee's income is allocated to the 401(k) rather than the possible limit of $17,500 for 2011. In some embodiments, the process 980 can suggest to the employee to put this difference (i.e., $17,500−$10,200=$7,300) in one or more of the other accounts, such as in the HSA. (Note, if the 402(g) limit is reached for 2013, the employee would contribute 7% which is $255,000*0.07=$17,850 which is then limited to $17,500.) In budget constrained situations the application of the option can make a real difference and would result in funding or not funding the HSA.

There can be a risk associated with the second option when the bMatchTo415LimitOnly is set. For example, if the option is applied and expected profit sharing contributions do not materialize, the employee can end up foregoing additional employee contributions and employer matching contributions. Using the example above, suppose profit sharing contributions is 6% instead of 12%, then after $15,300 in profit sharing contributions ($255,000*0.06=$15,300) is made, a total of $35,700 for employee contributions and employer matching contributions remains for the year 2013 ($51,000−$15,300=$35,700). Thus, in hindsight the employee could have made the full $17,500 contribution up to the 402(g) limit, instead of only $10,200.

In contrast, when the bMatchTo415LimitOnly flag is set to false, the employee can contribute up to the Sec. 402(g) limit. Using the same example above, if profit sharing contributions are indeed 12%, then $7,300 plus earning is refunded to the employee in the following year and the $7,300 in employer matching contributions (plus earnings) is forfeited in the current year. While there is no penalty to having this money refunded to the employee in the following year, the risk is one of lost opportunity. The $7,300 could have been contributed in 2011 to other accounts, such as to the HSA. Hence, for some individuals, making the full $17,500 contribution to the 401(k) plan in 2013 means forgoing the ability to take full advantage of the HSA in the same tax year.

In embodiments for partial year, a number of inputs that are used for these calculations are adjusted for a partial year calculation 960 by the partial year engine 970. For example, Annual Compensation needs to be prorated 700. Maximum includable compensation limit ($255,000 for 2013) is then applied to the prorated annual compensation. In some embodiments, Health Rewards Information may or may not be prorated depending on the plan sponsor elections. In another embodiment, the 415 Limit is adjusted 960 to reflect all the employee and employer contributions so far, and the 402(g) Limit is adjusted 960 to reflect all the employee contributions so far.

At step 840, if the marginal tax rate is higher in retirement, the process 980 contributes after-tax to a Roth 401(k) up to the matching contribution limit, subject to the same two options. Additionally, in embodiments for partial year calculations, the same adjustments 960 as above are required for steps 810-830.

At step 850, the process 980 estimates another amount for the employee to contribute to the FSA (FSA_Employee), which can be the minimum of any eligible FSA expense (FSA_Eligible_Expenses) and the FSA contribution limit (FSA_Contribution_Limit). In some embodiments, the employee can make withdrawals throughout the year from the FSA up to the FSA contribution amount (FSA_Employee) as needed. The FSA amount can be determined using the following equation:

$$FSA\_Employee=MIN(FSA\_Eligible\_Expenses,FSA\_Contribution\_Limit). \quad (Eq. 6)$$

In some embodiments, by contributing to the FSA, the process 980 needs to reduce the HSA eligible expenses because the HSA expenses are being assumed by the FSA. Hence, the total HSA withdrawal amount (HSA_Annual_Withdrawal) from Eq. 4 is adjusted according to the equation below:

$$\text{HSA\_Eligible\_Expenses=HSA\_Eligible\_Expenses-} \\ \text{FSA\_Employee HSA\_Annual\_Withdrawal=MIN} \\ \text{(HSA\_Eligible\_Expenses,HSA\_Company+} \\ \text{HSA\_Existing\_Balance+HSA\_employee)} \quad \text{(Eq. 7)}$$

In some embodiments, the process 980 also instructs the employee to make catch-up contributions to the HSA if the employee is eligible and if there are still remaining after-tax healthcare expenses (AT_After_FSA_HSA) that can be covered by the catch-up contributions.

In embodiments for partial year calculations, the proration and adjustments 960, 700 are the same as for steps 801, 802, and 803.

At step 860, the process 980 determines an amount for the employee to contribute to the HSA up to the HSA limit, including any catch-up contributions if available. In some embodiments, no employee HSA contribution is made at step 860 because the HSA limit has already been reached due to actions taken in the prior steps. The amount of employee contribution to the HSA, if possible, can be computed according to the following equation:

$$\text{HSA\_Employee=IF}(b\text{Married,HSA\_Limit\_Married-} \\ \text{HSA\_Company,HSA\_Limit\_Single-HSA\_Com-} \\ \text{pany)}. \quad \text{(Eq. 8)}$$

In addition, if catch-up contributions to the HSA are available, these contributions can be computed using the following equation:

$$\text{HSA\_Catchup=IF(currentAge>catch\_up\_Age\_HSA,} \\ \text{catch\_up\_Limit\_HSA)} \quad \text{(Eq. 9)}$$

In some embodiments, catch-up contributions are only available to the employee if the employee satisfied an age threshold (currentAge).

In embodiments for partial year calculations, the proration and adjustments 960, 700 are the same as for steps 801, 802, and 803.

At step 860, if the budget finishes up by this step, review the healthcare account contributions. At step 870, if HSA limit is not maxed out, the process 980 consolidates the healthcare contributions into a single HSA account if possible (HSA accounts are preferred over FSAs as HSA balances can be rolled over, as opposed to the use-it-or-lose-it nature of FSAs). Consolidation is possible if there are no exclusive FSA-eligible expenses and the healthcare spending (HSA withdrawal and FSA withdrawal) can be covered given the HSA balances, employer HSA contributions and employee HSA contributions.

In embodiments for partial year calculations, the proration and adjustments 960, 700 are the same as for steps 801, 802, and 803.

In some embodiments, an additional step, step 880, the process 980 plans to pay off any high interest debt to the extent possible. The interest rate on the debt is assumed be sufficiently higher from the long-term return assumptions. This would be true for most credit card loans and unsecured personal loans. In some embodiments, the budget is adjusted to pay off this loan and the payment would be recorded as an after-tax expense.

At step 890, if the marginal tax rate is the same or lower in retirement, the process 980 determines an amount for the employee to contribute on a pre-tax basis to the qualified plan of step 840, such as to the 401(k) plan, up to the contribution limit of the plan. In some embodiments, if the employee is 50 years or older, the employee is allowed to contribute to the catch-up limit of the 401(k) plan as well. However, at step 890, if the marginal tax rate is higher in retirement, the process 980 determines the participant will contribute after-tax to the Roth 401(k) to the contribution limit. If the participant age is 50 or over, contribution is made to the catch-up limit as well.

At step 890, the process 980 determines an amount for the employee to contribute on a pre-tax basis to his IRA and/or the spouse's IRA, up to the contribution limit of the IRAs. Each of the IRAs can be a traditional IRA or a Roth IRA.

In embodiments for partial year calculations 960 for the pre-tax and Roth 401(k) accounts, the process 980 uses the same adjustments as in 840. In some embodiments, for IRA contributions limit ($5,500 in 2013 and $1,000 for catch-up), the partial year engine 970 adjusts 960 for any existing IRA contributions. In some embodiments the partial year engine 970 calculates Adjusted Gross Income (AGI) for IRA eligibility, and must adjust or recalculate 960 several variables, including incomes such as 1) Annual compensations for respondent and spouse where this adjustment is different from the adjustment for matching 401(k) contributions. This is a time-weighted average or actual annual compensation over the whole year. In some embodiments, no other recalculations required for other types of income. In other embodiments, the partial year engine 970 adjusts 960 for reductions such as 401(k) contributions (Note for this embodiment, any previous contributions have to be added to the recommended contribution in the above steps.). Likewise, adjustments 960 must be made for HSA contributions (similar to 401(k)), IRA contributions, and Health plan premiums. For some embodiments with IRA contributions, the IRA contribution recommendation from this step could be ignored, however, any previous IRA contributions are incorporated in reductions. For some embodiments with Health plan premiums, any previous paid premiums are added to the premiums due for the remainder of the year.

At step 900, the process 980 determines an amount for the employee to contribute on an after-tax basis to his Roth IRA and/or the spouse's Roth IRA, up to the contribution limit of the IRAs. In embodiments for partial year calculations, the process 980 follows the same IRA related adjustments as in the pre-tax IRA. However, if any pre-tax IRA contributions were recommended so far, these contributions are added to the reductions in this step.

At step 910, the process 980 determines an amount for the employee to contribute to the HSA, but prevents the employee from making any withdrawal of HSA eligible expenses from the HSA. Instead, the employee is instructed to pay these expenses with after-tax, out-of-pocket dollars. Because a HSA allows tax-free withdrawal for qualified medical purposes, contributions to the HSA at step 910 provides a similar meaning for employee future retirement savings as contributing on an after-tax basis to a Roth IRA in step 900. However, contributing on an after-tax basis to a Roth IRA may be preferred because withdrawals from a Roth IRA are tax free for any purposes, assuming that the employee meets the 5-year aging requirement and the minimum age requirement for withdrawal. In contrast, withdrawals from a HSA are only tax free for qualified medical expenses. Therefore, in some embodiments, step 910 is not executed if the employee wants to consolidate his investment into the Roth IRA.

At step 920, the process 980 determines an amount for the employee to contribute on an after-tax basis to a traditional IRA and/or the spouse's traditional IRA, up to the contribution limit of the traditional IRAs. The process 980 can also recommend the employee to contribute on an after-tax basis to one or more tax-deferred annuities or efficient taxable accounts. In some embodiments, the process 980 directs the employee to invest in a tax-deferred annuity if the tax advantage of the tax deferral minus annuity account fees outweighs the tax advantage of lower capital gain rates by investing in a taxable account.

At step 930, the process 980 determines any remaining amount for the employee participant to be contributed to an additional tax-deferred annuity or taxable account. A boolean value, bAfterTaxIRA, is set to true if contributions are invested in anything except highly efficient equities or highly efficient equity mutual funds. Basically, if the tax advantage of tax-deferral (but taxed as ordinary income) after annuity account fees outweighs the tax-advantage of lower capital gains rates on some or all of the taxable account investment, then the process 980 direct the contributions to the after-tax deferred annuity.

The above-described techniques and processes, such as the processes of FIGS. 5, 6 and 8, can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computerized method for maximizing savings benefits for an employee by managing health care and retirement contributions, comprising:
receiving, by a computing device from a graphical user interface device, input identifying a participant and a contribution budget for the participant that specifies a total amount available for allocation for a remaining part of the current year;
retrieving, by the computing device, information identifying a plurality of financial accounts associated with the participant, wherein the plurality of financial accounts comprises at least a retirement account associated with a retirement plan and at least one health care account associated with a health care plan, wherein the retrieved information comprises at least an annual limit on participant contribution amounts for each of the financial accounts and previous contribution amounts deposited respectively in each of the financial accounts during the current year by the participant;
generating, by the computing device, partial year adjusted contribution limits for the plurality of financial accounts, the partial year adjusted contribution limits being derived from at least the annual limits and the previous contribution amounts;
generating, by the computing device, a savings hierarchy that identifies a plurality of savings milestones for the remaining part of the current year represented by data comprising (i) a recommended funding sequence of the plurality of financial accounts and (ii) recommended contribution amounts for the plurality of financial accounts at each step of the funding sequence for the remaining part of the current year, wherein the recommended funding sequence and the recommended contribution amounts are dependent on the partial year adjusted contribution limits;
allocating, by the computing device, the contribution budget across the financial accounts according to the recommended funding sequence and up to the recommended contribution amounts of the savings hierarchy limited by the contribution budget; and
transmitting, by the computing device, the saving hierarchy including the recommended funding sequence and the recommended contribution amounts for display on the graphical user interface device, wherein the display comprises a graphical representation that visually depicts (i) the savings hierarchy as a plurality of consecutive sectors, each sector identifying at least a portion of a financial account that corresponds to a step in the recommended funding sequence, a length of each sector representing a corresponding recommended contribution amount, and the respective positions of the plurality of consecutive sectors representing the recommended funding sequence and (ii) a graphical indicator referencing a position on the savings hierarchy that represents a level to which the financial accounts are funded by the allocated contribution budget.

2. The computerized method of claim 1 further comprising,
receiving, by the computing device, from the graphical user interface input specifying an updated contribution budget for a remaining part of the current year;
reallocating, by the computing device, the updated contribution budget across the financial accounts based on the recommended funding sequence and up to the recommended contribution amounts of the savings hierarchy limited by the updated contribution budget; and
displaying, by the computing device, on the graphical user interface an updated representation of the savings hierarchy with the graphical indicator referencing a position on the savings hierarchy that represents a level to which the financial accounts are funded by the allocated updated contribution budget.

3. The computerized method of claim 1 further comprising generating the savings hierarchy based on a predetermined set of rules for the plurality of financial accounts.

4. The computerized method of claim 1 further comprising generating the savings hierarchy based on a marginal tax rate in retirement.

5. The computerized method of claim 1 further comprising generating the savings hierarchy based on tax related adjustments from the marginal tax rate in retirement.

6. The computerized method of claim 1 further comprising,
retrieving, by the computing device, an employer match amount for at least one of the plurality of financial accounts;
further adjusting, by the computing device, the partial year adjusted contribution limits for the plurality of financial accounts, the partial year adjusted contribution limits being derived from at least the annual limits, the previous contribution amounts, and the employer match amount; and
wherein the savings hierarchy for the remaining partial year is based on the plurality of financial accounts, the retrieved information, the partial year adjusted contribution limits, and the employer match amount.

7. The computerized method of claim 1 wherein the plurality of accounts includes a interest-bearing debt account comprising at least a balance, an interest rate and a minimum payment amount.

8. The computerized method of claim 1 further comprising generating the savings hierarchy to apportion the contribution budget to the health care account to cover at least an eligible spending amount specified by the health care plan.

9. The computerized method of claim 1, wherein the plurality of accounts includes an IRA account and the retrieved information about the IRA account comprises at least a balance, annual limits on participant contribution amounts for the IRA account and previous contribution amounts deposited respectively in the IRA account during the current year by the participant.

10. The computerized method of claim 9, further comprising determining IRA eligibility for partial amounts based on the partial year adjusted contribution limits and the retrieved information about the IRA account.

11. The computerized method of claim 1, further comprising displaying the savings hierarchy, by the computing device, in the shape of an arch.

12. The computerized method of claim 11, further comprising displaying the indicator, by the computing device, as a dial that rotates along the edge of the arch.

13. The computerized method of claim 1, wherein the recommended contribution amount corresponding to a sector is represented as met when the indicator reaches an end of the sector.

14. The computerized method of claim 13, further comprising the graphical user interface representing allocating at least a portion of the contribution budge to the next sector in the order of the recommended funding sequence of the savings hierarchy when the recommended contribution amount for the previous sector is met by moving the indicator into the next sector.

15. The computerized method of claim 1, wherein the arch length of each sector is varied to represent the corresponding recommended contribution amount for each sector.

16. The computerized method of claim 1, further comprising displaying each sector, by the computing device, having a first subsection and a second subsection, the first subsection representing a percentage of the corresponding recommended contribution amount funded by the contribution budget and the second subsection representing a percentage of the corresponding recommended contribution amount funded by an employer match amount.

17. The computerized method of claim 1 further comprising,
retrieving, by the computing device, an employer seed amount for at least one of the plurality of financial accounts;
further adjusting, by the computing device, the partial year adjusted contribution limits for the plurality of financial accounts, the partial year adjusted contribution limits being derived from at least the annual limits, the previous contribution amounts, and the employer seed amount; and
wherein the savings hierarchy for the remaining partial year is based on the plurality of financial accounts, the retrieved information, the partial year adjusted contribution limits, and the employer seed amount.

18. The computerized method of claim 1, further comprising displaying each sector, by the computing device, having a first subsection and a second subsection, the first subsection representing a percentage of the corresponding recommended contribution amount funded by the contribution budget and the second subsection representing a percentage of the corresponding recommended contribution amount funded by an employer seed amount.

19. The computerized method of claim 1, further comprising generating, in response to the occurrence of a qualified life event, a second savings hierarchy for the remaining part of the current year after the qualified life event.

20. A computer program product, tangibly embodied in a machine readable storage device, the computer program product including instructions being operable to cause a data processing apparatus to:
receive, at a graphical user interface device, input identifying a participant and a contribution budget for the participant that specifies a total amount available for allocation for a remaining part of the current year;
retrieve information identifying a plurality of financial accounts associated with the participant, wherein the plurality of financial accounts comprises at least a retirement account associated with a retirement plan and at least one health care account associated with a health care plan, wherein the retrieved information comprises at least an annual limit on participant contribution amounts for each of the financial accounts and previous contribution amounts deposited respectively in each of the financial accounts during the current year by the participant;
generate partial year adjusted contribution limits for the plurality of financial accounts, the partial year adjusted contribution limits being derived from at least the annual limits and the previous contribution amounts;
generate a savings hierarchy that identifies a plurality of savings milestones for the remaining part of the current year represented by data comprising (i) a recommended funding sequence of the plurality of financial accounts and (ii) recommended contribution amounts for the plurality of financial accounts at each step of the funding sequence for the remaining part of the current year, wherein the recommended funding sequence and the recommended contribution amounts are dependent on the partial year adjusted contribution limits;
allocate the contribution budget across the financial accounts according to the recommended funding sequence and up to the recommended contribution amounts of the savings hierarchy limited by the contribution budget; and
transmit the saving hierarchy including the recommended funding sequence and the recommended contribution amounts for display on the graphical user interface device, wherein the display comprises a graphical representation that visually depicts (i) the savings hierarchy as a plurality of consecutive sectors, each sector identifying at least a portion of a financial account that corresponds to a step in the recommended funding sequence, a length of each sector representing a corresponding recommended contribution amount, and the respective positions of the plurality of consecutive sectors representing the recommended funding sequence and (ii) a graphical indicator referencing a position on the savings hierarchy that represents a level to which the financial accounts are funded by the allocated contribution budget.

21. A system for maximizing savings benefits for an employee by managing health care and retirement contributions, comprising:
means for receiving input identifying a participant and a contribution budget for the participant that specifies a total amount available for allocation for a remaining part of the current year;
means for retrieving information identifying a plurality of financial accounts associated with the participant, wherein the plurality of financial accounts comprises at least a retirement account associated with a retirement plan and at least one health care account associated with a health care plan, wherein the retrieved information comprises at least an annual limit on participant contribution amounts for each of the financial accounts and previous contribution amounts deposited respectively in each of the financial accounts during the current year by the participant;
means for generating partial year adjusted contribution limits for the plurality of financial accounts, the partial year adjusted contribution limits being derived from at least the annual limits and the previous contribution amounts;
means for generating a savings hierarchy that identifies a plurality of savings milestones for the remaining part of the current year represented by data comprising (i) a recommended funding sequence of the plurality of financial accounts and (ii) recommended contribution amounts for the plurality of financial accounts at each step of the funding sequence for the remaining part of the current year, wherein the recommended funding sequence and the recommended contribution amounts are dependent on the partial year adjusted contribution limits;

means for allocating the contribution budget across the financial accounts according to the recommended funding sequence and up to the recommended contribution amounts of the savings hierarchy limited by the contribution budget; and means for transmitting the saving hierarchy including the recommended funding sequence and the recommended contribution amounts for display on a graphical user interface device, wherein the display comprises a graphical representation that visually depicts (i) the savings hierarchy as a plurality of consecutive sectors, each sector identifying at least a portion of a financial account that corresponds to a step in the recommended funding sequence, a length of each sector representing a corresponding recommended contribution amount, and the respective positions of the plurality of consecutive sectors representing the recommended funding sequence and (ii) a graphical indicator referencing a position on the savings hierarchy that represents a level to which the financial accounts are funded by the allocated contribution budget.

* * * * *